(12) United States Patent
Saward

(10) Patent No.: US 7,287,943 B1
(45) Date of Patent: Oct. 30, 2007

(54) ACCESSORY SLOT FASTENER ASSEMBLY

(75) Inventor: Ronald G. Saward, Shelby Township, MI (US)

(73) Assignee: Sportrack LLC, Sterling Heights, MI (US)

(*) Notice: Subject to any disclaimer, the term of this patent is extended or adjusted under 35 U.S.C. 154(b) by 104 days.

(21) Appl. No.: 11/102,013

(22) Filed: Apr. 8, 2005

(51) Int. Cl.
*B60P 7/08* (2006.01)

(52) U.S. Cl. ................................. 410/104; 410/106

(58) Field of Classification Search ............ 410/8–11, 410/104–106; 224/321, 322, 325, 326, 329, 224/330; 248/220.21, 222.52
See application file for complete search history.

(56) References Cited

U.S. PATENT DOCUMENTS 3,972,500 A * 8/1976 Johnson et al. ............... 410/85
6,769,847 B1 * 8/2004 Heilmann .................... 410/104

* cited by examiner

*Primary Examiner*—Stephen Gordon
(74) *Attorney, Agent, or Firm*—Rader, Fishman & Grauer PLLC

(57) ABSTRACT

A fastener assembly including a base plate and an arm having a first end, the first end extending from the base plate, the arm further including a retention member spaced away from the first end, and a fastener associated with the base plate and the first end for assembling accessories to an article carrier system.

8 Claims, 6 Drawing Sheets

ACCESSORY SLOT FASTENER ASSEMBLY

FIELD OF THE INVENTION

The present invention relates generally to article carrier systems for motor vehicles, and more particularly, to a slot fastener assembly for securing article carrier accessories, such as cross rails, to the article carrier system.

BACKGROUND OF THE INVENTION

Article carrier systems are well known throughout the automotive industry for use in storing or retaining luggage, bicycles, small boats, or the like on the exterior of a vehicle even while the vehicle is in motion. Typically, article carrier systems include a number of individual components such as supports, side rails, stanchions, cross rails, and the like.

Generally, in a roof mounted carrier system, supports are secured to each of the four corners of the roof of a vehicle. Each of a pair of side rails is positioned between and secured to two of the four supports so that the two side rails are essentially parallel to each other and extend between the front and the rear of the vehicle. Often one or more cross rails are secured, generally perpendicularly, to the side rails to provide a cradle for the article being transported, so that the article can be adequately secured to the vehicle and damage to the vehicle's roof may be avoided. The complete assembly forms the article carrier system. Similar systems can be configured for the trunk lid, pickup bed, or just about any exterior surface of a vehicle.

Side rails may be manufactured with channels to allow the user to slide and locate cross rails at any point along the length of the side rail. Cross rails may be attached to the side rails as part of an initial mounting of the article carrier system on the vehicle. Each of the cross rail ends are slid into a respective end of each of the side rail channels. This is the optimal situation for assembling cross rails or any other article carrier accessory to the side rails.

Once the carrier system is mounted on the roof, the ends of each of the side rails providing access to the channels, are closed to prevent the cross rail from sliding out of the channels. By closing the side rails an anti-theft aspect is also contemplated. However, if cross rails are not added during the original mounting of the article carrier device on the roof of the vehicle or there is a subsequent need or wish to add some other accessory to the carrier system, the side rails and supports may have to be disassembled in order to slide the accessory components into the channels of the side rails. This may result in unwanted excess labor and cost and may also create the possibility of damage to the vehicle.

Therefore, a need exists for an accessory slot fastener assembly that can be inserted in the channel and assembled to the side rail of an article carrier system after the system has been mounted on a vehicle.

SUMMARY OF THE INVENTION

A fastener assembly for mounting accessories to an elongate rail member of an article carrier system is provided. The fastener assembly includes a base plate and an arm having a first end. The first end of the arm extends from the base plate and the arm further includes a retention member spaced away from the first end. A fastener is associated with the base plate and the first end for assembling the accessories to the article carrier system.

The accessory slot fastener assembly provides for accessories, such as cross rails, to be secured to the side rails of an article carrier device without having to disassemble any components of the article carrier device, such as supports or side rails.

BRIEF DESCRIPTION OF THE DRAWINGS

The features and inventive aspects of the present invention will become more apparent from the following detailed description, claims, and drawings, of which the following is a brief description:

DETAILED DESCRIPTION

Figure 1:
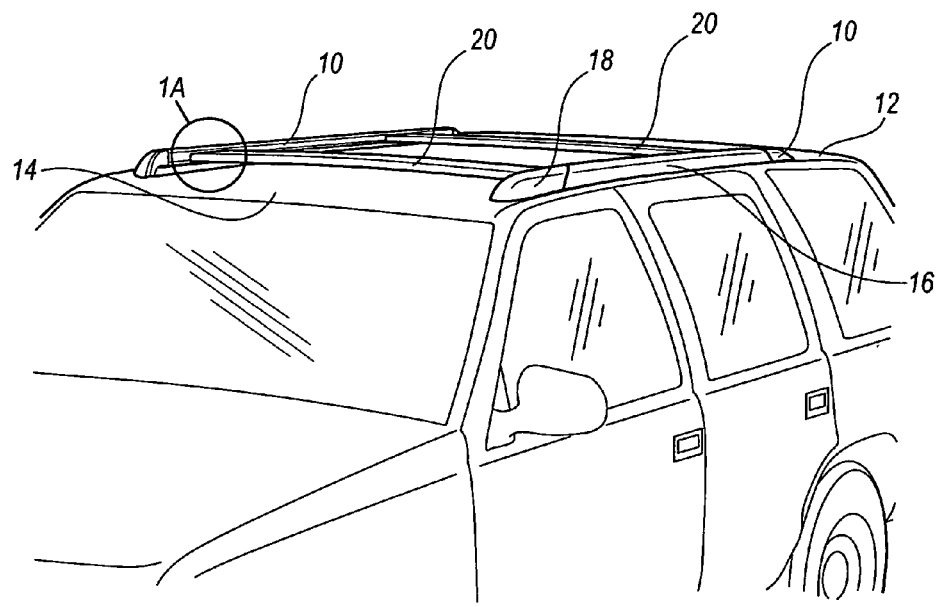
FIG. 1 is a perspective view of an article carrier system according to an embodiment of the present invention.

Referring now to the drawings, preferred illustrative embodiments of the present invention are shown in detail. Although the drawings represent embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

Figure 1A:
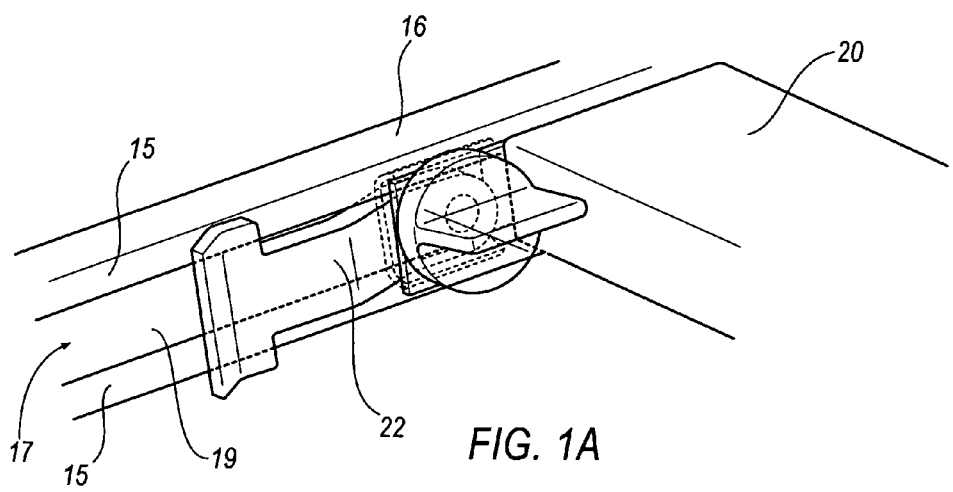
FIG. 1A is a perspective view, enlarged from FIG. 1, of an accessory slot fastener assembly according to an embodiment of the present invention.

Referring to FIGS. 1 and 1A, an article carrier system 10 is shown attached to the exterior surface 12 of a vehicle 14 or the like. In the embodiment shown in FIGS. 1 and 1A, article carrier system 10 is shown mounted on the roof portion of vehicle 14; however, it is important to note that article carrier system 10 could be mounted on any other suitable exterior surfaces of a vehicle, such as a trunk lid for example.

In a roof mounted system, article carrier system 10 includes side rails 16 that extend the length of the roof between the front and the rear. Side rail 16 is generally a channeled member having flanges 15 defining an open channel 17 therebetween and configured to create a slot 19 that extends along a length of side rail 16. Side rails 16 are mounted on the vehicle's roof at supports 18. As illustrated in FIGS. 1-5B, channels 17 are shown facing inward of the vehicle, however, it is important to note that each embodiment of the present invention will function equally as well if channels 17 face outward or upward with respect to the vehicle surface. As illustrated in FIGS. 1 and 1A, supports 18 close the ends of side rails 16 and channels 17 so that cross rails 20 or other accessories may be captured by the carrier system. If the system of FIGS. 1 and 1A were conventional, a user wishing to add or remove cross rails 20 from carrier system 10 would be required to disassemble supports 18 and side rails 16 to do so. However, an accessory slot fastener assembly 22 is provided in accordance with an embodiment of the present invention to eliminate the need for disassembly of carrier system 10 to remove or add cross rails 20 or other article carrier accessories.

FIGS. 1A, 2, 2A, and 2B illustrate accessory slot fastener assembly 22 according to an embodiment of the present invention. Slot fastener assembly 22 includes a base plate 24 having a pair of cleats 26 on opposite sides of base plate 24. However, it is important to note that slot fastener assembly 22 may be manufactured without cleats 26 and the slot fastener assembly will still be operable. An arm 28 extends from base plate 24 having a first end 30 that extends from between cleats 26 of base plate 24. Arm 28 also has a second end 32, opposite first end 30, which includes a pair of tabs 33 that extend away from arm 28 to terminate at edges that are generally wider than the remainder of arm 28 and may in a preferred embodiment be as wide as cleats 26 to selectively engage the outer surfaces of flanges 15. Although tabs 33 are shown positioned at second end 32, tabs may be positioned anywhere along arm 28 to aid in seating slot fastener assembly in channel 17 for securement of cross rail 20. Second end 32 also includes a centering post 31 extending away from second end 32 in a direction generally perpendicular to tabs 33 for centering slot fastener assembly 22 during positioning in slot 19.

Base plate 24 and first end 30 of arm 28 also include an aperture 34. Aperture 34 may be sized to receive a fastener such as a threaded nut for accepting a bolt from an accessory, such as cross rail 20, to secure the accessory to side rail 16. Aperture 34, in the alternative, may be sized to receive a threaded stud for accepting a nut, such as a wing nut, to attach the accessory to side rail 16 (See FIGS. 3, 3A, and 3B). Aperture 34 has been described as including a threaded nut or threaded stud for accessory assembly purposes, however, it is important to note that aperture 34 may include any type of fastener suitable for securing an accessory to article carrier system 10. Of course, even if a bolt and nut combination are used, the nut may be associated with the accessory and the bolt associated with slot fastener assembly 22.

Cleats 26 may be formed and sized in a manner that allows them to be seated against flanges 15 of channel 17 when slot fastener assembly 22 is positioned in side rail 16. Cleats 26 engage flanges 15 as slot fastener assembly 22 is seated in channel 17 by securing, for example, cross rail 20 to slot fastener assembly 22 with fastener 36 and it's mating accessory fastener. Cleats 26 also aid in strengthening a particularly weak side rail by capturing flanges 15 between cleats 26 and preventing the flanges from "splitting" when an accessory is mounted to article carrier system 10. Alternatively, as described above, plate 24 may be manufactured without cleats 26. In this particular embodiment, channel 17 of side rail 16 may include detents spaced periodically along channel 17 for seating plate 24 prior to securing an accessory to slot fastener assembly 22. When an accessory, such as cross rail 20, has been firmly attached to slot fastener assembly 22 and side rail 16, cleats 26, in turn, are fully engaged with, or compressed against, flanges 15 and firmly secure the accessory to side rail 16. In this manner, cross rail 20 is secured to slot fastener assembly 22 and side rail 16 by a compression fit. As the accessory fastener is tightened or secured to fastener 36, cleats 26 are being compressed against flanges 15 and the accessory fastener is compressing cross rail 20 against slot fastener assembly 22 to form the compression fit and aid in preventing cross rail 20 from sliding out of position in side rail 16 during transit while a load is secured to article carrier system 10.

First end 30 and base plate 26 are sized to be easily inserted through slot 19 and into channel 17. Side rail 16 should be sufficiently wide to allow first end 30 and base plate 24 to be completely inserted into slot 19 and channel 17. Also, side rail 16 should be sufficiently tall to allow for the easy manipulation of slot fastener assembly 22 within side rail 16. Cleats 26 are sized to be sufficiently wide to engage the interior surfaces of flanges 15 when slot fastener assembly 22 is seated in side rail 16, yet cleats 26 will not interfere with the top or bottom of channel 17. Tab 33 of second end 32 is sized to be wider than the remainder of arm 28 so that the slot fastener assembly 22 may be easily handled and seated in side rail 16 when employed as discussed below.

Accessory slot fastener assembly 22 may be manufactured of any metallic material, such as steel or aluminum, may be manufactured of any polymeric material, such as plastic or nylon, or preferably may be manufactured from a combination of metallic and polymeric materials. For example, base plate 24 may be manufactured from a metallic material, such as steel, and arm 28 may be manufactured from a polymeric material, such as plastic. For assembly of arm 28 to base plate 24, base plate 24 may include a tower 35 that surrounds aperture 34. Aperture 34 of arm may be sized to fit snuggly over tower 35 to create an interference fit of arm 28 and base plate 24. Tower 35 may be threaded to accept a mating fastener. Alternatively, base plate 24 may include a threaded stud 37 that extends through aperture 34. Aperture 34 of arm 28 may be sized so that arm 28 can be press fit onto the stud of base plate 24 to secure arm 28 to base plate 24.

Figure 2:
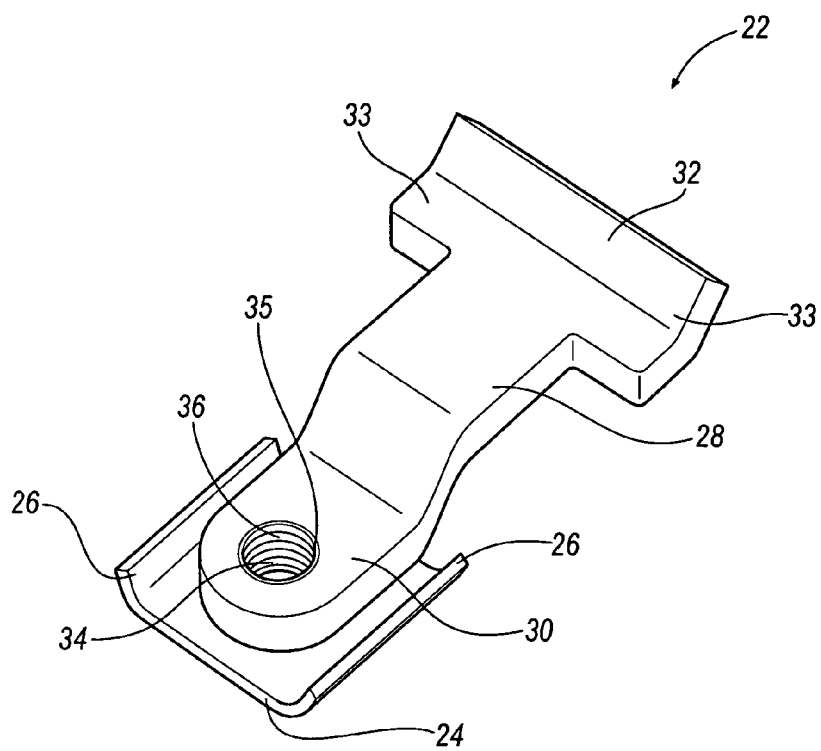
FIG. 2 is an enlarged perspective view of the accessory slot fastener assembly of FIG. 1A according to an embodiment of the present invention.
Figures 2A, 2B:
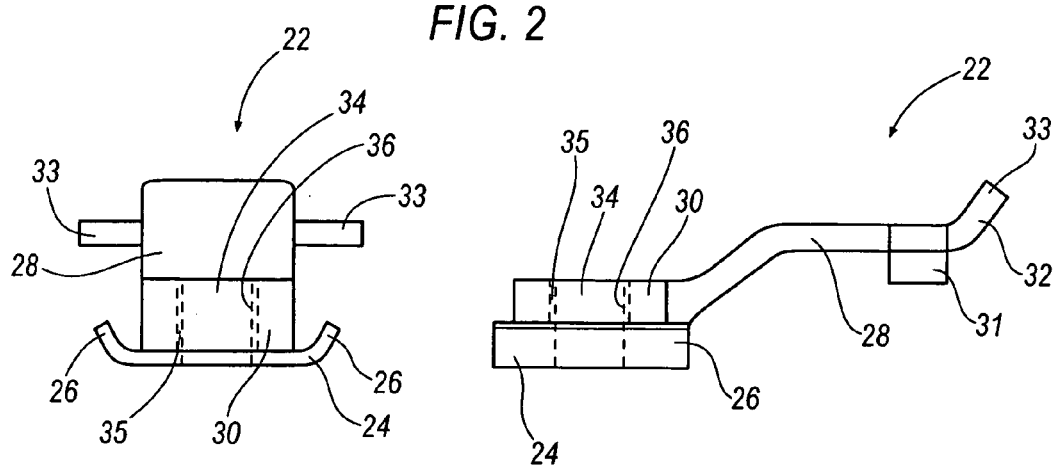
FIGS. 2A and 2B are side elevational views of the accessory slot fastener assembly of FIGS. 1A and 2.
Figure 4A:
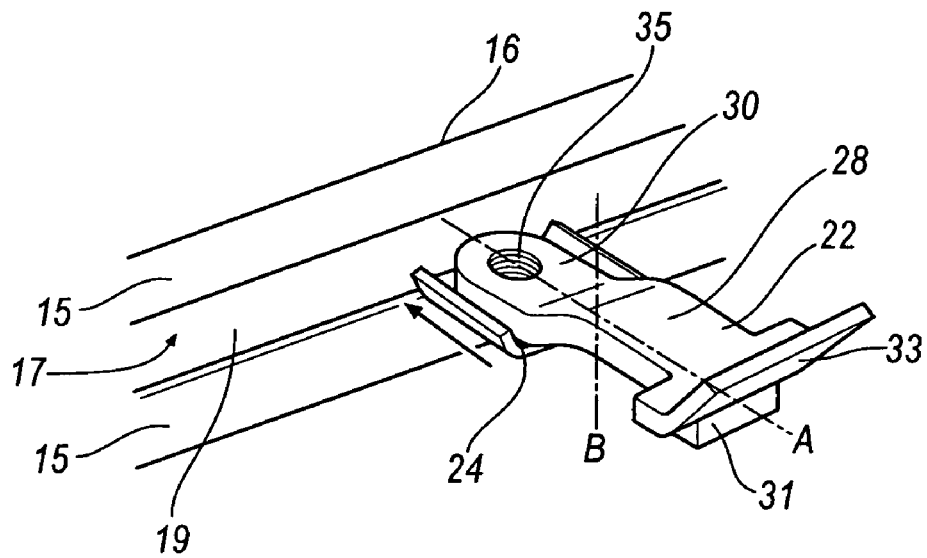
FIGS. 4A-4D are views showing how the accessory slot fastener assembly of FIGS. 2, 2A, and 2B is inserted into a side rail and assembled to the article carrier system.
Figure 4B:
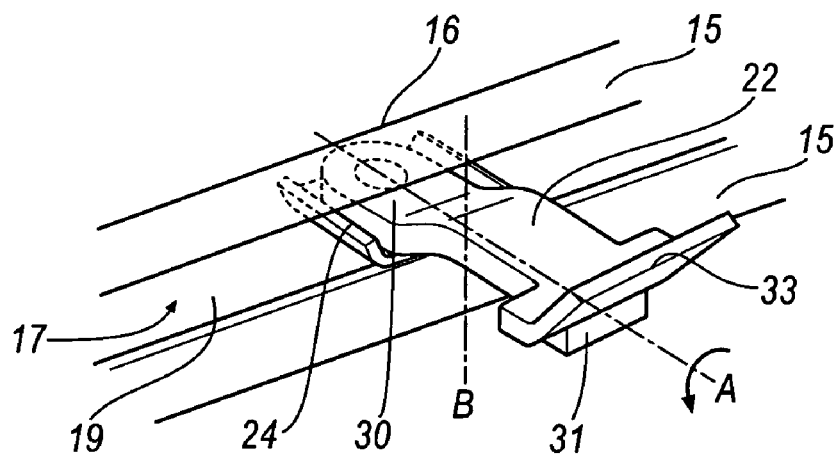
Figure 4C:
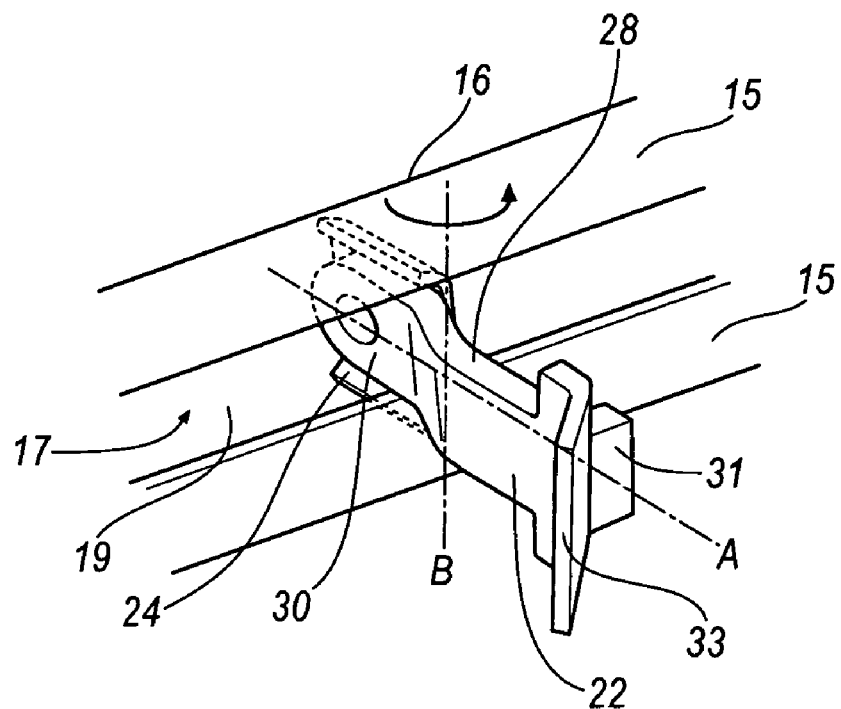
Figure 4D:
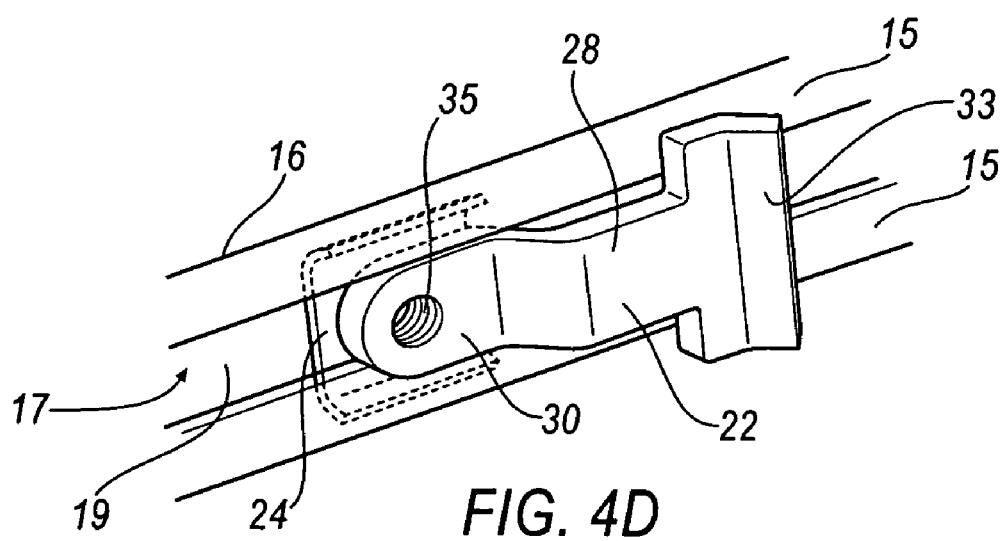

Now referring to FIGS. 4A-4D, assembly of the accessory slot fastener assembly 22 of FIGS. 2, 2A, and 2B to side rail 16 and cross rail 20 will be described according to an embodiment of the present invention. First, the slot fastener assembly is rotated about an axis B (axis B being generally perpendicular to axis A) so that base plate 24, cleats 26, and first end 30 are introduced through slot 19 and into channel 17 (see FIG. 4A). As discussed above, side rail 16 should be sufficiently wide so that base plate 24 can fit completely into channel 17 for easy manipulation to seat slot fastener assembly 22 in side rail 16 as discussed further below. Once cleats 26 have cleared flanges 15 of channel 17 (as shown in FIG. 4B), slot fastener assembly 22 is again rotated about axis A to capture slot fastener assembly 22 inside channel 17 (see FIG. 4C). Slot fastener assembly 22 is then rotated with respect to axis B by pushing tab 33 toward slot 19 and flanges 15 so that cleats 26 engage flanges 15 and first end 30 is residing in slot 19. In this way, fastener 36 is presented in a position to readily accept a mating fastener of the added accessory (see FIG. 4D). Tab 33 is pressed to hold slot fastener assembly 22 in place and to prevent base plate 24 and first end 30 from being pushed back into channel 17 as the accessory is secured. Multiple slot fastener assemblies may be added to side rail 16 to secure cross rail 20, or any number of different accessories, without having to go to the trouble of removing supports 18 and/or side rails 16 from the vehicle.

As illustrated in this particular embodiment, arm 28 and centering post 31 are shown to be the slightly smaller in width than channel 17. In this particular embodiment, both arm 28 and centering post 31 are designed to fit snugly in slot 19 so that surfaces of arm 28 and centering post 31 engage slot 19 to provide an increased load bearing surface for slot fastener assembly 22. Both arm 28 and post 31 may be substantially thinner than slot 19 for easier manipulation in channel 17, however, the load carried by cross rail 20 may be distributed more evenly if both arm 28 and post 31 are sized to engage edges of slot 19 rather than relying on the load bearing surface of cleats 26 alone. The snug fit of slot fastener assembly 22 in slot 19 will also aid in preventing slot fastener assembly 22 from twisting in slot 19 during assembly of cross rail 20 to side rail 16.

In another embodiment, centering post 31 may be manufactured such that it is as long as channel 17 is deep. In this manner, centering post 31 will engage an interior wall (not shown) of channel 17 as slot fastener assembly 22 is seated in side rail 16. In this particular embodiment, slot fastener assembly 22 may be manufactured without tabs 33. Rather than having tab 33 engage the outside of flanges 15 as slot fastener assembly 22 is seated, post 31 is sufficiently long to engage the interior wall of channel 17 so that cross rail 20 may be assembled to side rail 16.

Figure 3:
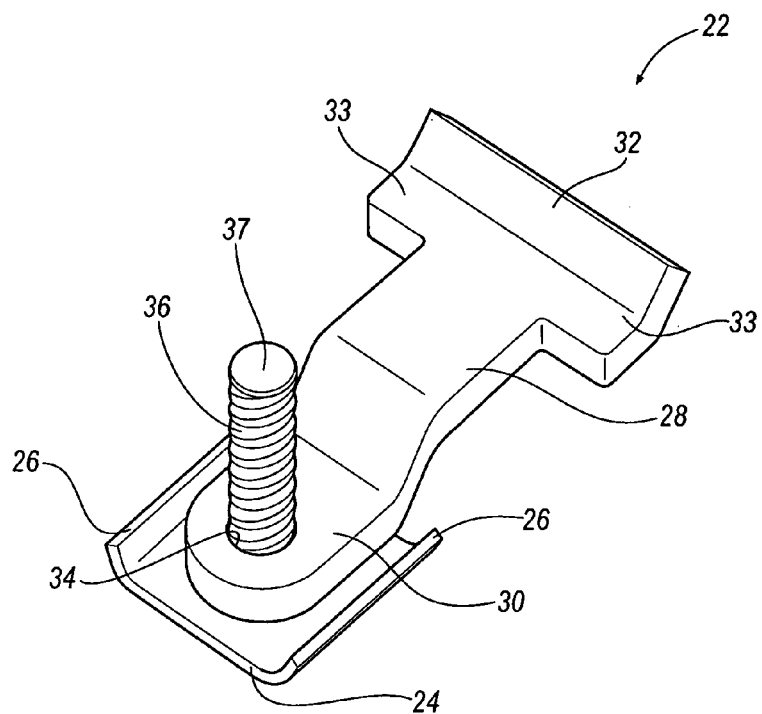
FIG. 3 is a perspective view of an accessory slot fastener assembly according to another embodiment of the present invention.
Figure 3A:
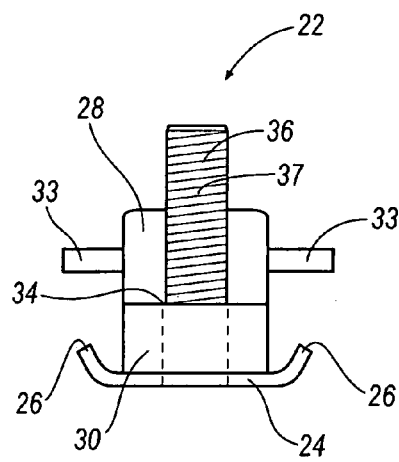
FIGS. 3A and 3B are side elevational views of the accessory slot fastener assembly of FIG. 3.
Figure 3B:
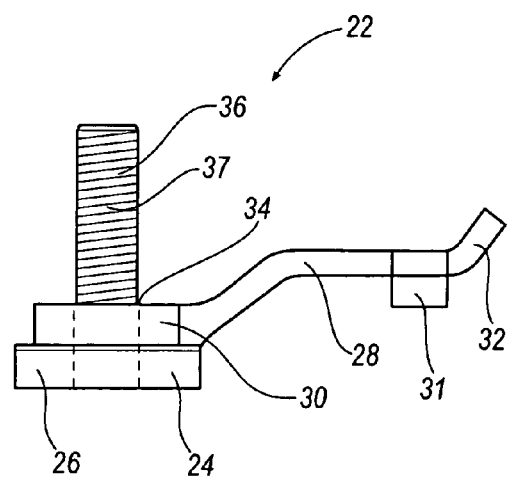
Figure 5A:
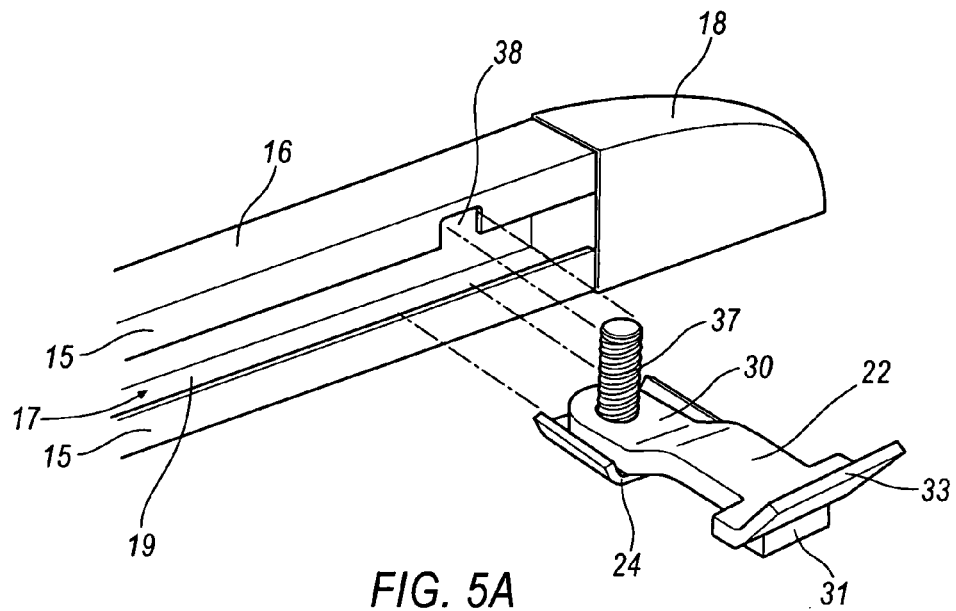
FIGS. 5A and 5B are views showing how the accessory slot fastener assembly of FIGS. 3, 3A, and 3B is inserted into the side rail and assembled to the article carrier system.
Figure 5B:
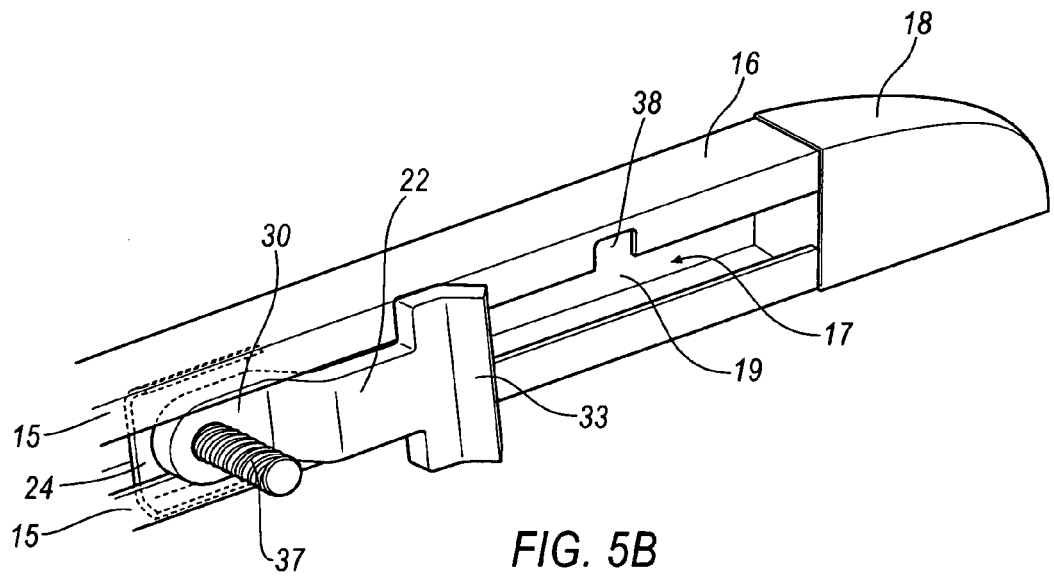

In another embodiment of the present invention, accessory slot fastener assembly 22 of FIGS. 3, 3A, and 3B may be assembled to side rail 16 in much the same manner as described above. However, a small access hole 38 may be required in side rail 16 to provide clearance for the threaded stud when slot fastener assembly 22 is assembled to side rail 16. FIGS. 5A and 5B illustrate side rail 16 with access hole 38. Slot fastener assembly 22 is inserted into side rail at hole 38 and then rotated and turned in channel 17 as described above to present the threaded stud for assembly to cross rail 20 or any other accessory.

In yet another embodiment of the present invention, second end 32 may be configured such that the accessory added to the article carrier system 10 may cover or hide accessory slot fastener 22 to maintain the aesthetics of the vehicle. Second end 32 may also include a snap or locating feature (not shown) such that when an accessory is presented to accessory slot fastener 22 for securement to article carrier system 10, the snap or locating feature of the assembly fastener cooperates with a corresponding feature on the stanchion or accessory to locate the accessory on assembly fastener 22. This will aid in aligning the hole in the accessory with fastener 36 to facilitate an easier assembly of the accessory to the side rail.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. An accessory slot fastener assembly for mounting accessories to an elongate rail member of an article carrier system, the rail member forming a channel having an open side and a pair of flanges extending along a length of the rail member, to define a slot at the open side, said accessory slot fastener assembly comprising:
    a base plate having a pair of cleats positioned on opposite sides of said base plate to selectively engage the flanges;
    an arm fixed to said base plate for rotation therewith; said arm having a first end, said first end extending from between said cleats, said arm further including a retention member spaced away from said first end; and
    a base plate fastener coupled with said base plate at said first end;
    whereby said base plate and said first end are sized to be inserted through the slot and said accessory slot fastener assembly being positioned such that said pair of cleats engages the pair of flanges.

2. An accessory slot fastener assembly as recited in claim 1, wherein said arm includes a second end.

3. An accessory slot fastener assembly as recited in claim 2, wherein said arm is angled between said first end and said second end, said arm selectively engaging an outer surface of the flanges, said first end positioned within the channel.

4. An accessory slot fastener assembly as recited in claim 1, wherein said retention member includes a pair of tabs.

5. An accessory slot fastener assembly as recited in claim 1, wherein said retention member includes a centering post.

6. An accessory slot fastener assembly as recited in claim 1, wherein said retention member includes a pair of tabs and a centering post disposed between said pair of tabs.

7. An accessory slot fastener assembly as recited in claim 1, wherein said base plate fastener is a hollow tower that extends from said base plate, said tower being internally threaded to accept a mating fastener to secure accessories to the rail member.

8. An accessory slot fastener assembly as recited in claim 1, wherein said base plate is formed of a first material and said arm is formed of a second material.

* * * * *